United States Patent [19]

Gentles

[11] Patent Number: 5,327,771

[45] Date of Patent: Jul. 12, 1994

[54] LOADING PROBE FOR USE IN TESTING TRANSDUCERS

[75] Inventor: Robert Gentles, Avonbridge, Scotland

[73] Assignee: GEC Ferranti Defence Systems Limited, England

[21] Appl. No.: 904,396

[22] Filed: Jun. 25, 1992

[30] Foreign Application Priority Data

Jul. 8, 1991 [AU] Australia .................... 80277/91

[51] Int. Cl.$^5$ ............................................ H01L 41/22
[52] U.S. Cl. .................................... 73/1 DV; 367/13
[58] Field of Search ............ 73/1 DV, 866.5; 367/13

[56] References Cited

U.S. PATENT DOCUMENTS

| 4,331,021 | 5/1982 | Lopez et al. | 73/1 DV |
| 4,475,376 | 10/1984 | Keilman | 73/1 DV |
| 4,747,295 | 5/1988 | Feist et al. | 73/1 DV |
| 4,838,070 | 6/1989 | Bradley | 367/13 |
| 4,959,992 | 10/1990 | Gentles | 73/1 DV |

Primary Examiner—Hezron E. Williams
Assistant Examiner—Daniel S. Laikin
Attorney, Agent, or Firm—Kirschstein

[57] ABSTRACT

A loading probe for use in testing transducers includes an elongated body capable of simulating the normal acoustic impedance presented to a transducer to be tested by the medium in which the transducer is to operate. The main body of the loading probe has a tube made from a rigid material, and a rod having an elongated convergent portion extending into the interior of the tube so as to define a cavity which has a varying cross section. The cavity houses a core of material having a close match of acoustic impedance with the material of the tube and rod but a higher acoustic loss factor. The cavity is sealed. The active end of the loading probe carries a piezoelectric element having a planar form, and a protective end cap is bonded to the active end of the loading probe to enclose the piezoelectric element.

5 Claims, 2 Drawing Sheets

LOADING PROBE FOR USE IN TESTING TRANSDUCERS

BACKGROUND OF THE INVENTION

1. Field of the Invention

The present invention concerns the testing of transducers such as piezoelectric transducers. In order to test such transducers it is necessary to simulate the normal acoustic impedance presented to them in the medium in which they are intended to operate. One application involving the use of transducers is in generating or detecting acoustic signals under water.

2. Description of the Related Art

In British Patent Specification No. 2217952B there is described a loading probe or rod for use in testing transducers and which comprises an elongated body capable of simulating the normal acoustic impedance presented to a transducer to be tested by the medium in which the transducer is to operate, the rod having a bore in its main body portion containing a core of material having a close match of acoustic impedance with the material of the rod but a higher acoustic loss factor. In this prior specification a preferred embodiment of the rod is manufactured from an acrylic polymer and has a tapered bore in its main body portion.

However, this arrangement has proved difficult and expensive to manufacture and the present invention is concerned with meeting this problem.

British Patent Specification No. 2192514 discloses a measurement probe for carrying out the same type of measurement operation and in which a piezo electric transducer is mounted in the main body of the probe after the impedance matching network. The present invention is also concerned with providing a measurement probe or loading rod which can give more accurate results than that disclosed in the aforesaid prior specification.

SUMMARY OF THE INVENTION

According to a first aspect of the present invention there is provided a loading probe for use in testing transducers and comprising an elongated body capable of simulating the normal acoustic impedance presented to a transducer to be tested by the medium in which the transducer is to operate, the main body of the loading probe comprising a tube made from a rigid material, a rod having an elongated convergent portion extending into the interior of the tube so as to define a cavity which has a varying cross section, the cavity housing a core of material having a close match of acoustic impedance with the material of the tube and rod but a higher acoustic loss factor, and means for sealing the cavity.

According to a second aspect of the present invention there is provided a loading probe for use in testing transducers and which comprises an elongated body capable of simulating the normal acoustic impedance presented to a transducer to be tested by the medium in which the transducer is to operate, the active end of the loading probe carrying a piezo electric element having a planar form, and a protective end cap is bonded to the active end of the loading probe to enclose the piezo electric element.

BRIEF DESCRIPTION OF THE DRAWINGS

In order that the present invention may be more readily understood an embodiment thereof will now be described by way of example and with reference to the accompanying drawings, in which.

DETAILED DESCRIPTION OF THE PREFERRED EMBODIMENT

Figure 1:
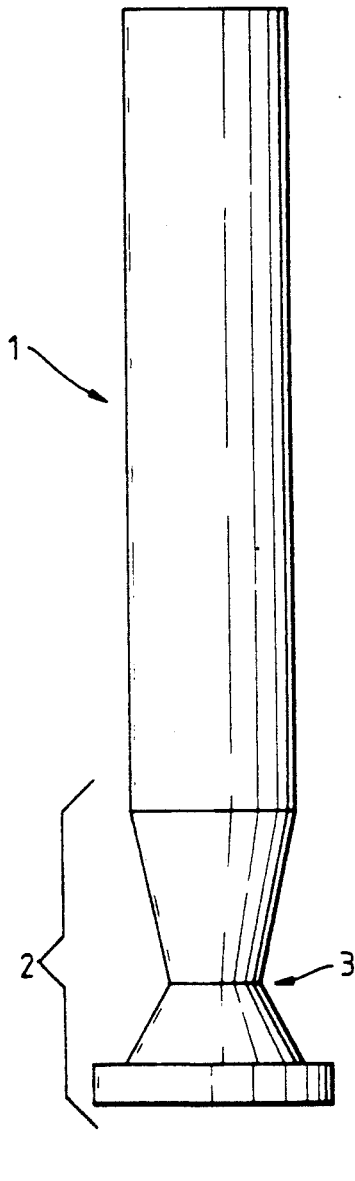
FIG. 1 is a side elevation of an acoustic loading probe or rod.

Referring to the drawings, FIG. 1 is an outer view of a robe 1 which carries a piezo electric transducer at its active end or foot 2. The purpose of the probe is to present a mechanical impedance to a piezo electric transducer which corresponds to the complex load, normally referred to as $Z_L$, which the transducer sees when immersed in water. The load represented by the rod 1 is equivalent to a mass in series with a radiation resistance both of which vary with frequency. In use the test transducer or active end 2 of the rod 1 is placed in contact with the emitting head of a transducer being tested. The contact can be improved by the use of a couplant in the form of a suitably viscose fluid to exclude air bubbles.

As can be seen from FIG. 1, the transducer end 2 of the probe 1 has a waisted portion indicated at 3. This waisted portion is made of a pair of opposed frusto conical sections.

The actual shape of the probe is obtained by using an iterative procedure using a computer program which calculates the response of given shapes and compares them graphically to a set of theoretical water load impedances. Using a combination of transmission line theory and experience a skilled operator can modify the shapes to obtain appropriate matches.

Figure 2:
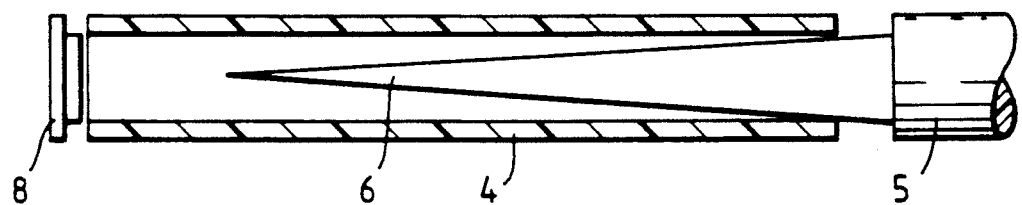
FIG. 2 is a section through a main body portion of the probe of FIG. 1.

FIG. 2 of the drawings shows the main part of the probe of FIG. 1 prior to final assembly. Thus this main body part comprises a hollow tube 4 made from a rigid, low-loss material such as an acrylic polymer. One suitable material is perspex. Into this tube 4 is placed a plastic rod 5 of a similar material which has been machined to produce a spiked shape 6 at one end which fits neatly into the tube 4. The spiked rod 5 is bonded to the tube 4 and the cavity inside the tube 4 then filled with an acoustically absorbent material 7. This material can be a partially polymerised metal loaded epoxy resin. The material has a close match of acoustic impedance to the material of tube 4 and rod 5 but has a very high acoustic loss factor. A suitable material is LOCTITE METAL-SET S2 mixed in the ratio of 100% hardner to 40% adhesive. This ratio may change slightly in accordance with requirements. The manufacturer's recommended mix for full polymerisation is 100% hardener to 100% adhesive plus or minus 10%. Alternative materials may include soft plastics mixed with some high density loading material.

Figure 3:
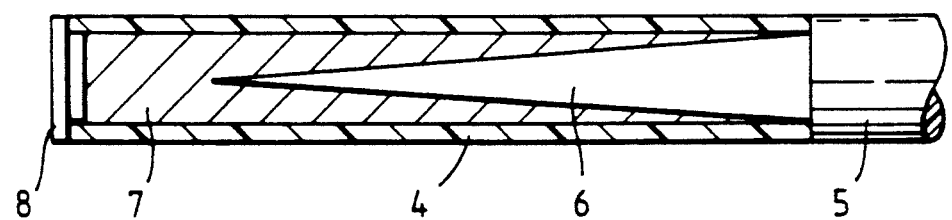
FIG. 3 is a similar view showing the assembled probe.

The unit is completed by sealing the end of the probe 1 opposite its active end 2 with an end cap 8. The final unit is shown in FIG. 3.

Figure 4:
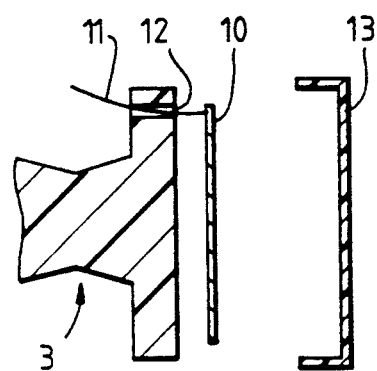
FIG. 4 is a partially exploded view showing how a transducer can be mounted at the active end of the probe.
Figure 5:
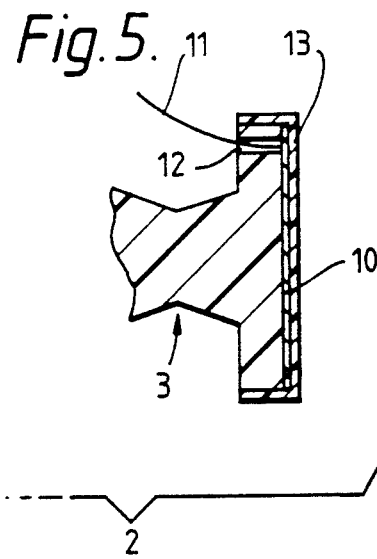
FIG. 5 shows the assembled transducer end.

In the probe described in prior British Patent No. 2192514 a piezo electric transducer is mounted in the main body of the probe after the impedance matching network. However in the present embodiment more accurate results are obtained by mounting a piezo electric element 10 on the face of the probe foot 2. The wires 11 connecting the piezo electric element 10 are routed through a hole 12 in the probe foot 2 and a protective end cap 13 is then bonded to the probe foot 2 enclosing the piezo electric element 10. FIGS. 4 and 5 show the steps in this procedure.

I claim:

1. A loading probe for use in testing transducers, comprising an elongated body capable of simulating the normal acoustic impedance presented to a transducer to be tested by the medium in which the transducer is to operate, the main body of the loading probe comprising a tube made from a rigid material, a rod having an elongated convergent portion extending into the interior of the tube so as to define a cavity which has a varying cross section, the cavity housing a core of material having a close match of acoustic impedance with the material of the tube and rod but a higher acoustic loss factor, and means for sealing the cavity.

2. A probe according to claim 1 wherein the elongated portion of the rod extending within the tube is in the form of a pointed spike.

3. A probe according to claim 1 wherein the sealing means comprises a cap having a boss which is a fit within the internal cavity of the tube.

4. A loading probe for use in testing transducers, comprising an elongated body capable of simulating the normal acoustic impedance presented to a transducer to be tested by the medium in which the transducer is to operate, the probe having an active end carrying a piezo electric element having a planar form, and a protective end cap is bonded to the active end of the loading probe to enclose the piezo electric element.

5. A probe according to claim 4 wherein the active end of the probe has a bore through which connecting wires for the piezo electric element pass.

* * * * *